(No Model.) 6 Sheets—Sheet 1.
C. L. REDFIELD.
MATRIX MAKING MACHINE.

No. 468,975. Patented Feb. 16, 1892.

Witnesses
C. B. Martin.
A. L. Jones.

Inventor
Casper L. Redfield
By his Attorney
P. H. Gunckel (No Model.) 6 Sheets—Sheet 2.

C. L. REDFIELD.
MATRIX MAKING MACHINE.

No. 468,975. Patented Feb. 16, 1892.

Witnesses
C. B. Martin.
A. L. Jones.

Inventor
Casper L. Redfield
By his Attorney
P. H. Gunckel (No Model.) 6 Sheets—Sheet 4.

C. L. REDFIELD.
MATRIX MAKING MACHINE.

No. 468,975. Patented Feb. 16, 1892.

Witnesses
C. B. Martin
A. L. Jones

Inventor
Casper L. Redfield
By his Attorney
P. H. Gunckel (No Model.) 6 Sheets—Sheet 5.
C. L. REDFIELD.
MATRIX MAKING MACHINE.
No. 468,975. Patented Feb. 16, 1892.
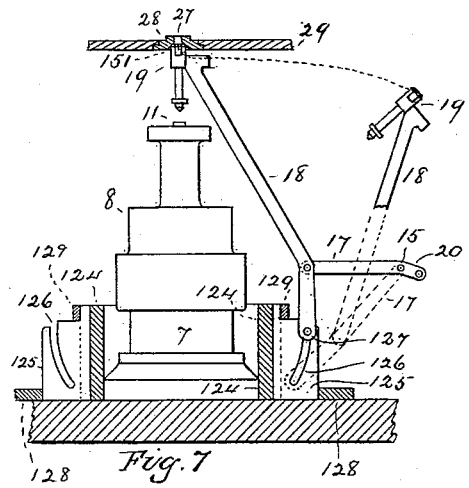
Fig. 7
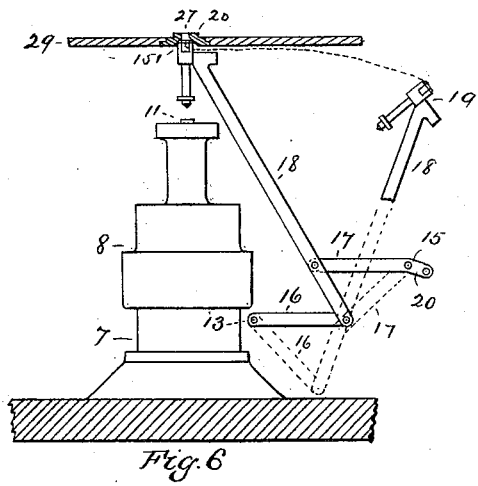
Fig. 6
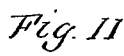
Fig. 11
Fig. 10
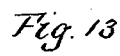
Fig. 13
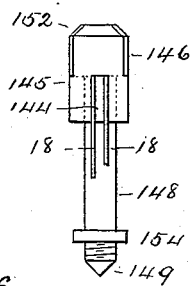
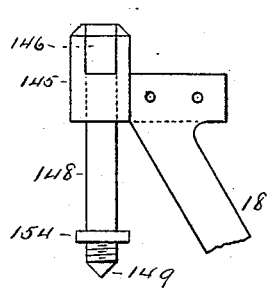
Fig. 12
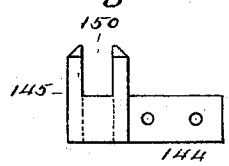
Fig. 14
Fig. 15
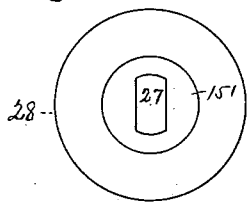
Fig. 16
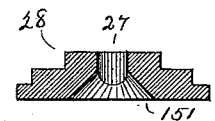
Fig. 17
Witnesses
C. B. Martin
A. L. Jones
Inventor
Casper L. Redfield
By his Attorney
P. H. Gunckel (No Model.) 6 Sheets—Sheet 6.

C. L. REDFIELD.
MATRIX MAKING MACHINE.

No. 468,975. Patented Feb. 16, 1892.

Witnesses
C. B. Martin
A. L. Jones

Inventor
Casper L. Redfield
By his Attorney
P. H. Gunckel

UNITED STATES PATENT OFFICE.

CASPER L. REDFIELD, OF CHICAGO, ILLINOIS, ASSIGNOR TO THE CHICAGO MATRIX MACHINE COMPANY.

MATRIX-MAKING MACHINE.

SPECIFICATION forming part of Letters Patent No. 468,975, dated February 16, 1892.

Application filed September 26, 1890. Serial No. 366,240. (No model.)

*To all whom it may concern:*

Be it known that I, CASPER L. REDFIELD, a citizen of the United States, residing at Chicago, in the county of Cook and State of Illinois, have invented certain new and useful Improvements in Matrix-Making Machines, of which the following is a specification.

My invention relates to matrix-making machines, and has for its object the production of a simple machine that will be capable of performing the various functions required to produce matrices suitable for ordinary justified print and which is adapted to be operated in much the same manner as an ordinary type-writing machine. This object is accomplished by the mechanism illustrated in the accompanying drawings, in which—

Figure 1:
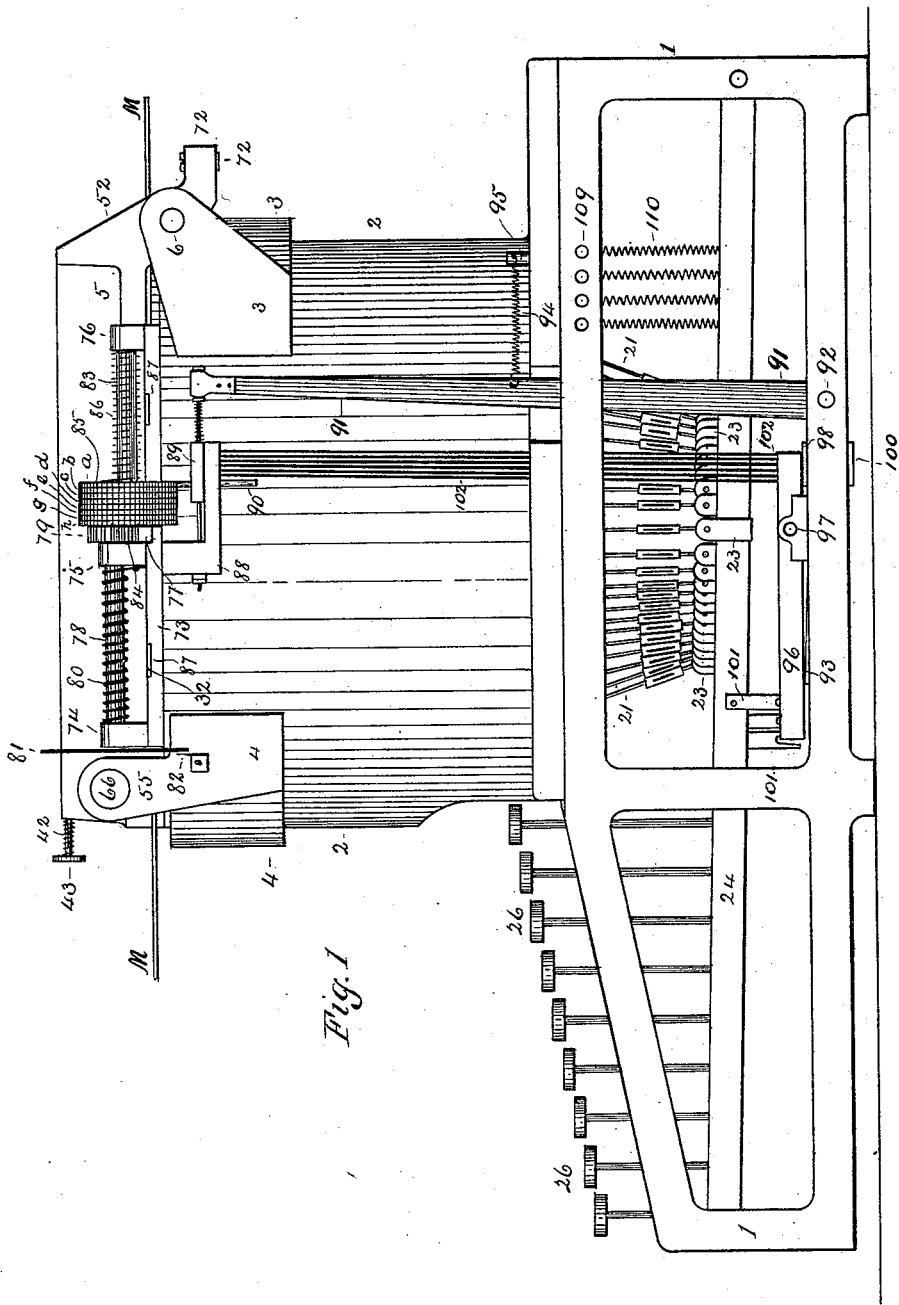
Figure 2:
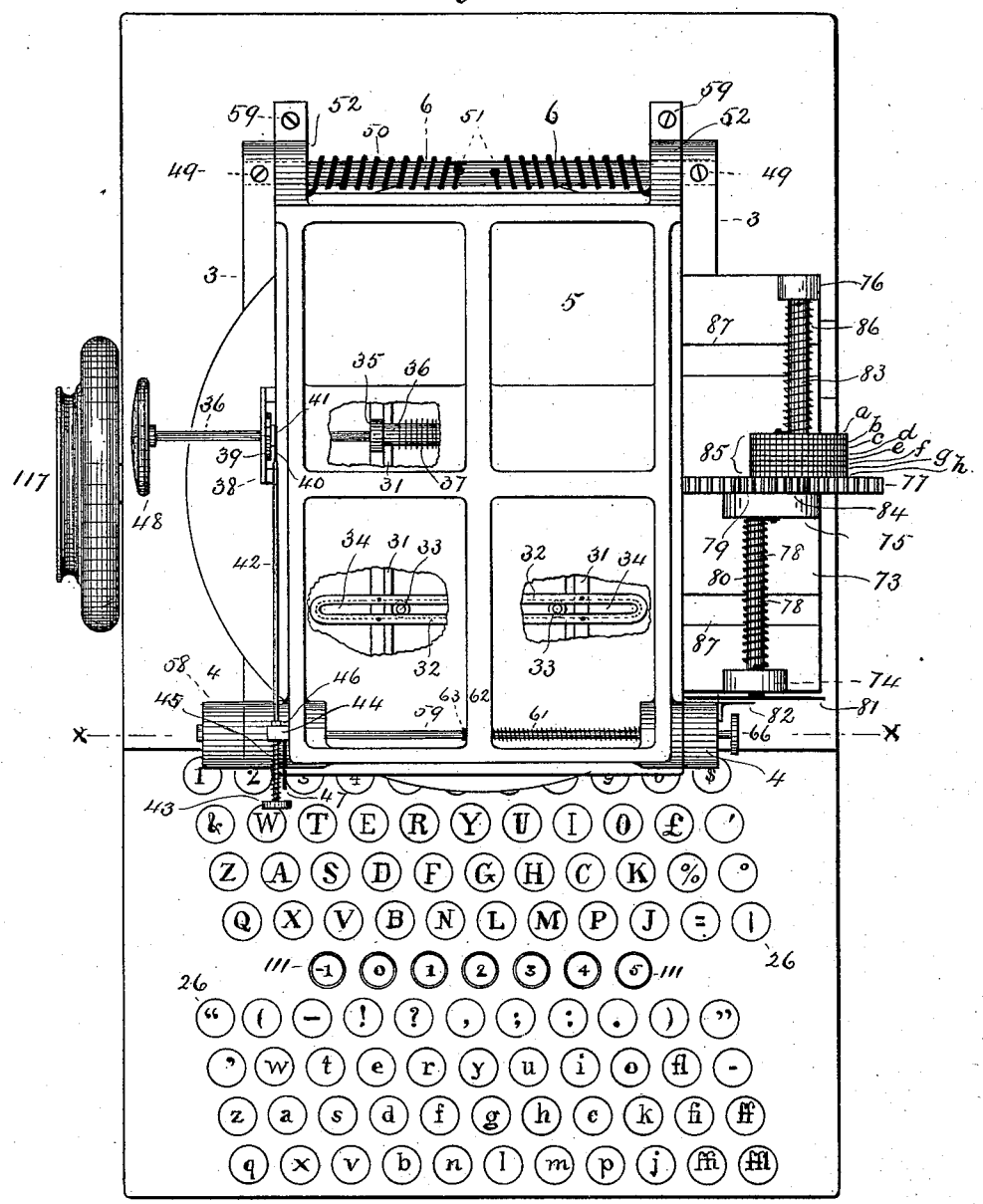
Figure 3:
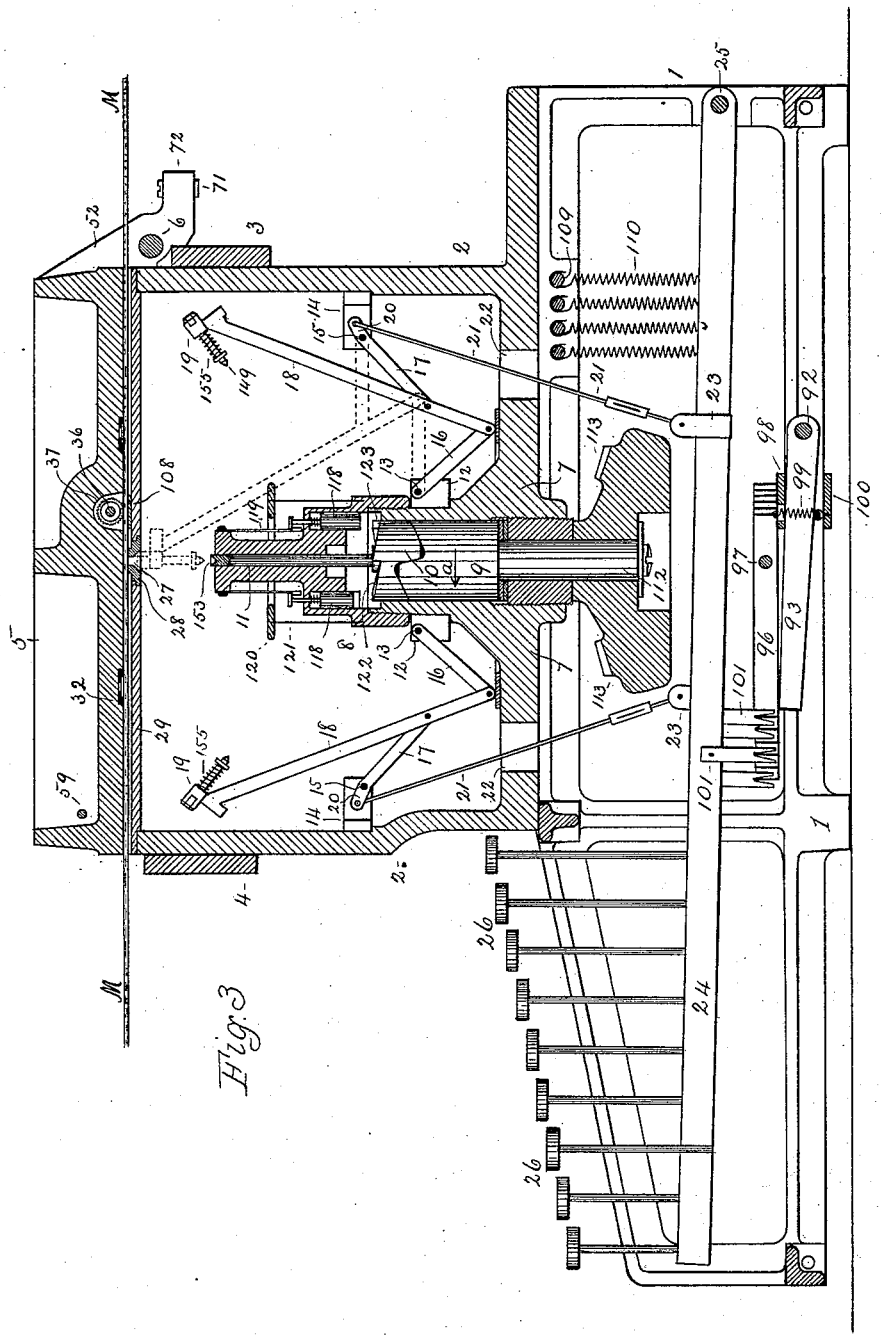
Figure 4:
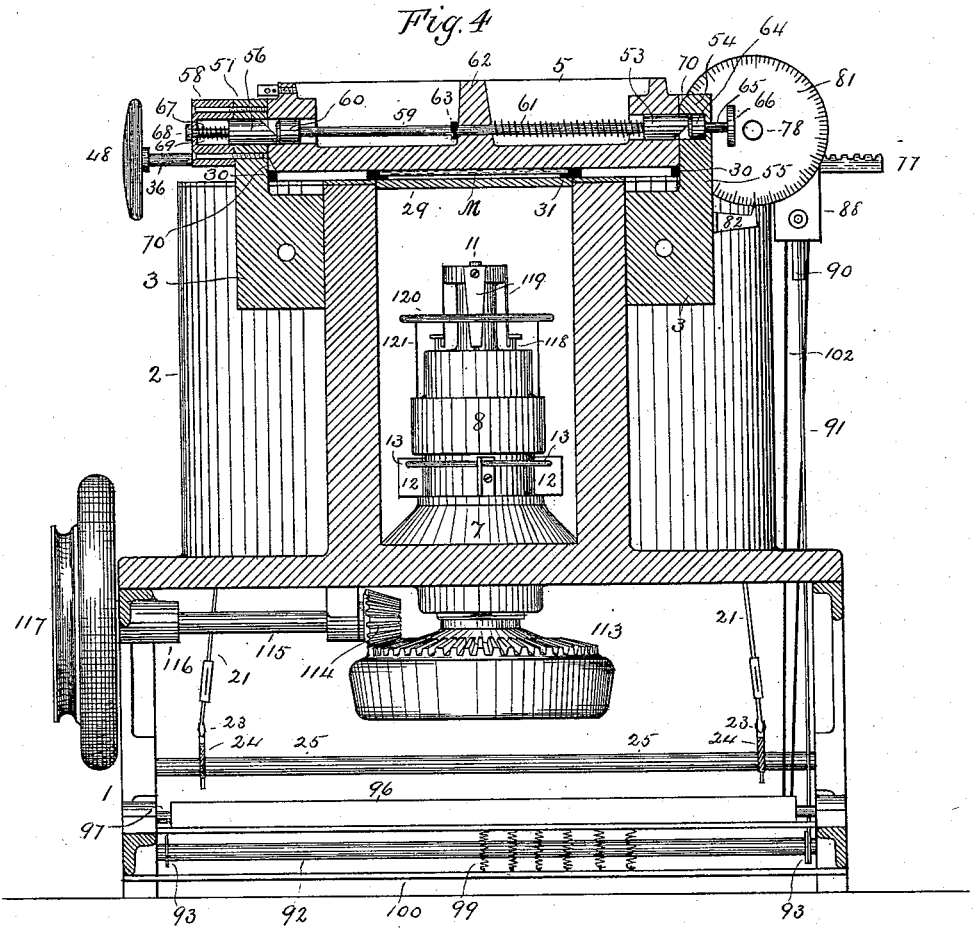
Figure 5:
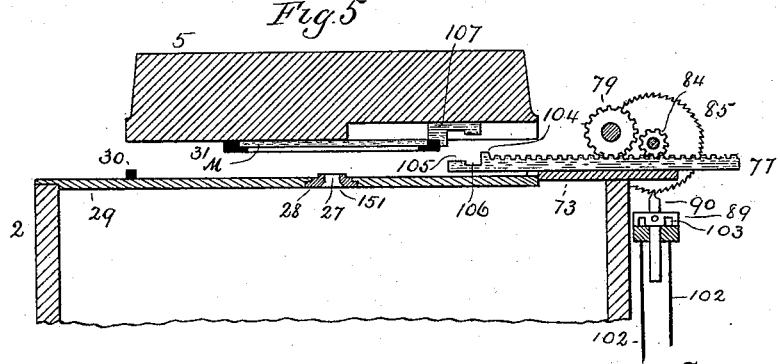
Figure 9:
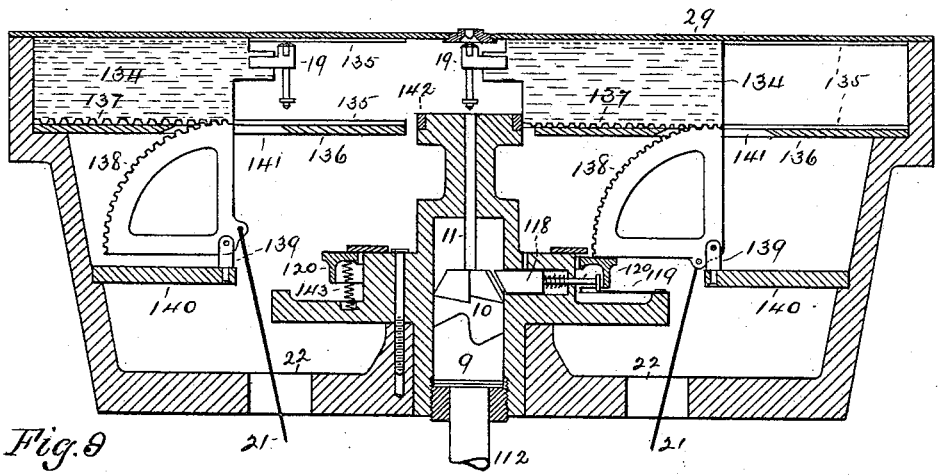
Figure 8:
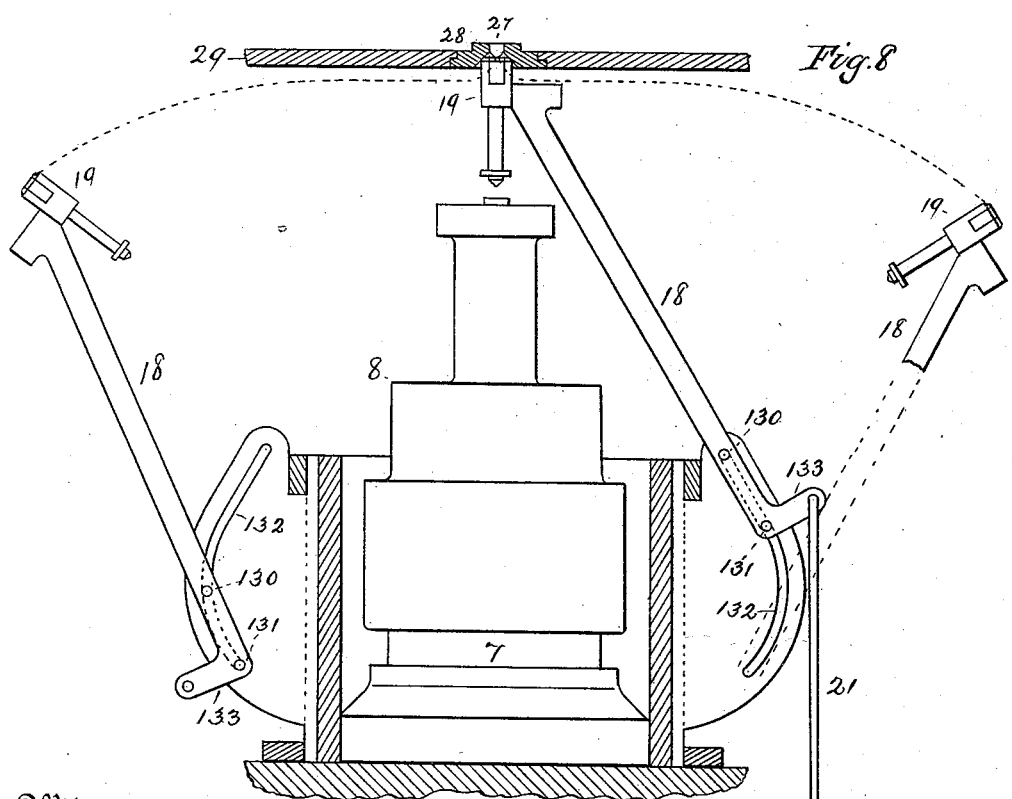

Figure 1 is a side elevation of the machine. Fig. 2 is a plan of the same. Fig. 3 is a central longitudinal section. Fig. 4 is a transverse section on the line $x\ x$ of Fig. 2 with part of the connections omitted. Fig. 5 is a partial central transverse section with the printing-platen slightly elevated. Fig. 6 is a detached view of one of the die-carrying devices, showing it at its extremes of movement. Fig. 7 is a similar detail showing a modified form of devices for producing the same results. Fig. 8 shows still another form of devices for bringing the die to the printing-point. Fig. 9 shows another means upon a different plan for presenting the dies to the printing point; and Figs. 10 to 17 are details of the type-die, its socket, and the die-guiding bushing.

In said drawings, 1 designates a frame, on which is mounted a casing 2 of circular or other suitable form. To the outside of the casing, near its top and at opposite sides, are secured brackets 3 and 4, respectively. On top of the casing is the printing-platen 5, which is hinged on a shaft 6, mounted in the bracket 3. In the interior of the casing is a raised central part 7, having a cap 8 screwed on its top. These parts 7 and 8 are made hollow, and within them is an impression device consisting of a continuously-rotating lower member 9 and an upper rotating and intermittingly-reciprocating member 10, the latter carrying a plunger 11, operating opposite the printing-point of the platen. This impression device is similar to that described in my patent, No. 429,742, of June 10, 1890, with only such modifications as adapt it to the present form of machine, and a more particular description thereof herein is deemed unnecessary.

To the raised central body 7 are fastened brackets 12, that support a circular shaft 13, and on the inside walls of the casing 2 are brackets 14, which support another circular shaft 15. On these shafts 13 and 15, respectively, are pivoted links or levers 16 and 17, which extend downward and toward each other and have pivoted to their free ends levers 18, that have their upper ends free and carry type-sockets 19. The links 17 have arms 20 extending outside their pivotal points 15, to which are connected rods 21, that extend downward through slots 22 in the casing 2 and are connected to clips 23 on the key-levers 24, and the key-levers are pivoted on a shaft 25 and actuated by the finger-keys 26.

The operation of the die-carriers and the connections between them and the finger-keys serves to present the type-dies successively at a central position under the printing-point. At the printing-point is an aperture 27 in a bushing 28 in the center of a plate 29, that is supported by the casing 2. Between the platen 5 and the plate 29 are two narrow strips 30, extending lengthwise of the platen along its outer edge. These strips serve as stops to limit the downward movement of the platen and serve, also, to provide a space between the platen and the plate 29, in which is located the matrix-carriage 31. This carriage extends lengthwise of the platen and is free to move at right angles thereto the length of a line of print.

On the top of and extending across the carriage 31 are two cross-pieces 32, which fit in corresponding grooves in the bottom of the platen. These cross-pieces are fastened rigidly to and form part of the matrix-carriage and are held to the platen by bolts 33, that pass through slots 34 in the cross-pieces 32. These bolts have thin heads that fit in grooves cut in the cross-pieces along the sides of the slots 34, (shown by dotted lines in Fig. 2,)

thus permitting the cross-pieces to slide back and forth with the carriage without striking the heads of the bolts 33.

Immediately in the rear of the printing-point, in the bushing 28 and between it and the rear cross-piece 32, are brackets 35, fixed on the carriage 31 and carrying a shaft 36. On this shaft, between the brackets and over the matrix-carriage, is a series of fine-toothed feed-wheels 37, adapted to slightly indent the top surface of the matrix material M and feed it forward in the carriage when the shaft 36 is rotated. At one side of the platen 5 is a small frame 38, through which the shaft 36 passes, and on this shaft, between the platen and the frame, is a ratchet-wheel 39, feathered to the shaft, and a lever 40 and pawl 41, adapted to rotate the shaft. To the upper end of the pawl-carrying lever is fastened a rod 42, which extends along the side and top of the platen to the front of the machine and has attached to its end a button 43. A small bracket 44 is fastened to the side of the platen and serves as a support for the forward end of the rod 42. On the rod, between the bracket and the button, is a helical spring 45, which serves to keep the rod forced forward, the extent of its movement being restricted by a collar 46 on the rod that comes in contact with the bracket 44. In the bracket 44 is a pin 47, extending toward the button 43, which serves as a stop for the rod when pushed inward by hand. The length of this pin is such as to permit the inward movement of the rod 42 to cause the proper extent of rotation of the shaft 36 for turning the ratchet-wheel, and hence the feed-wheels, the proper distance to advance the matrix material from one line of print to the next. It is obvious that by making this pin 47 adjustable as to length or the collar 46 adjustable as to position on the rod 42 the line-spacing may be varied to suit any particular requirement.

On the extreme end of the shaft 36, at the left of the machine, is a small hand-wheel 48, which serves both as a means for returning the carriage to the beginning of a line by pushing it inward and by turning it from left to right to feed the matrix material quickly into or out of the carriage.

The shaft 6, on which the platen 5 is hinged, is held firmly from turning by set-screws 49 in the bracket 3. On this shaft are two springs 50, having adjacent ends fastened to it at points 51. The outer ends of the springs are fastened to or enter holes in lugs 52 on the platen 5, the lugs being utilized to furnish the hinge-point for the platen. These springs are given a strong initial tension that operates to raise the platen and the matrix-carriage, together with its connected parts, upward and away from the plate 29. This tension is resisted by a locking device between the forward end of the platen and the bracket 4. This locking device consists of two catches (one at each side of the platen) somewhat similar to door-catches, but both operated by one push-button at the right-hand side of the machine. One of these catches 53 is located at the right-hand side of the platen and engages the right-hand lug 54, formed on an extension 55 of the bracket 4, and the other catch 56 is located at the left of the platen in a lug 57 and its extension 58 on the bracket 4 and engages the left side of the platen. The right-hand catch 53 has a stem 59, that extends across the platen and terminates in a plunger 60. Around the stem 59 is a spring 61, that serves to keep the catch 53 pushed to the right by pressure against the middle rib 62 of the platen, the extreme movement to the right being determined by a collar 63 on the stem, which comes in contact with the side of the rib opposite the spring. In the lug 54 is an opening that receives the catch 53, and in this opening is a plunger 64, having a stem 65, on which is a push-button 66. The length of this plunger 64 and its stem 65 is just sufficient to permit the catch 53 to be released from the lug 54 when pushed inward by means of the button 66. The catch 53, stem 59, and plunger 60 have a combined length exactly equal to the width of the platen 5, so that when the plunger 64 releases the catch 53 the plunger 60 also releases the catch 56, thus leaving the platen free to rise. The catch 56 also has a stem 67, with a collar 68, engaging the lug-extension 58, and a spring 69 on the stem for carrying it a definite distance to the right when not forced to the left by the plunger 60.

The lower left-hand corner of the platen 5 and the upper left-hand corner of the lug 54 are slightly cut away, as shown at 70, to provide inclined surfaces for the catches 53 and 56 to slide on and give an easy action when the platen is lowered after being raised. The upward movement of the platen is limited by two set-screws 71 in the extensions 72 of the lugs 52. These set-screws 71 come in contact with the bracket 3 at the points where it diverges from the circular course of the casing 2 toward the lugs which support the shaft 6.

The plate 29 is cut away on the right-hand side flush with the edge of the platen to make room for the bracket 73, which holds the feeding devices. This bracket 73 has three lugs 74, 75, and 76 on its upper face, and next the lug 75 and directly opposite the center of the machine is planed a guideway for a rack 77, that extends inward and is connected to the matrix-carriage 31. In the lugs 74 and 75 is supported a shaft 78, on the end of which is a gear 79, which meshes in the rack 77. Around this shaft is a spring 80, one end of which is fast to the shaft and the other to one of the lugs 74 or 75. This spring 80 is given a moderately strong initial tension tending to rotate the gear 79 in the direction for moving the rack inward, and hence the matrix-carriage toward the left, Fig. 2. On the front end of the shaft 78, the end opposite the gear 79, is a dial 81, adapted to register the position of the matrix-carriage by means of the pointer 82 on the bracket 4.

Between the lugs 75 and 76 is supported a shaft 83, which also has a gear 84 meshing in the rack 77. On this shaft, next to the gear 84, is a series of eight ratchet-wheels 85, each of which has a movement of one or two teeth on the next adjacent one. Surrounding the shaft 83 is a spring 86, one end of which is attached to the shaft and the other to the first ratchet-wheel a of the wheels a, b, c, d, e, f, g, and h, which constitute the series 85. The spring 86, in addition to exerting a force to hold the several ratchet-wheels in frictional contact with one another, has a slight tension to turn them on their shaft in the direction that feeds the rack inward. These wheels are provided, respectively, with elongated slots, and, coinciding with the slots, pins, whereby one wheel is permitted to rotate on the next a distance equal to the space of one tooth and a corresponding movement of the matrix-carriage is thereby permitted. The bracket 73 is also cut out at 87 to receive the ends of the cross-piece 32 when the latter is at the extreme right-hand position.

Beneath the bracket 73 is fastened another bracket 88, on which is a sliding block 89, carrying a pawl 90, and the block is moved to place the pawl by a lever 91, fixed on a shaft 92, and the shaft is journaled in the lower part of the frame 1. On this shaft 92 is fixed a bail 93, which by means of the tension of a spring 94, attached to the lever 91 and to a lug 95, is held up against the bottom of a series of spacing-bails 96, that are pivoted on a shaft 97. The bails 96 form rectangles one within another, the rear ends being supported on a plate 98 and held thereto by springs 99, the ends of which are fastened to another underlying plate 100. On each one of the levers 24 is pivoted a clip 101, that extends downward and has a forked end embracing one of the bails or spacing-levers 96, and on the rear end of each spacing-lever, except one, is fixed a rod 102, that extends upward into the bracket 88, and which, when elevated by the tripping of the levers 96 on their shaft 97, serves as a stop-pin to arrest the movement of the pawl-carrying slide 89, the latter being recessed in the under surface, as at 103, to receive them, as shown in Fig. 5. The construction and operation of this spacing mechanism and its connections to the key-levers 24 are similar to that shown and described in an application for variable-spacing mechanism for type-writers, Serial No. 365,175, filed by me September 16, 1890, and is therefore herein described only in a general way.

The inner end of the rack 77 terminates in an upwardly-projecting lip 104, between which and another lip 105 is cut a recess 106. On the matrix-carriage 31, directly in line with the rack 77, is a piece 107, having lips and a recess adapted to engage the recess and lips on the end of the rack. The object of this construction is to make a firm connection with the rack and the matrix-carriage whenever the platen is lowered to printing position and permit a free separation whenever the platen (and hence the matrix-carriage) is raised for the purpose of examining the printing. This makes a suitable joint between the rack and carriage for causing movements for letter-spacing, the line-to-line feed being effected by moving the material in the carriage by means of the feed-wheels 37, operated by the shaft 36.

Across the matrix-carriage and fixed thereto below the feed-wheels 37 is a piece 108. It is between the feed-wheels 37 and this piece 108 that the matrix material passes, and the piece 108 serves as a support to hold the matrix material up against the feed-wheels.

The construction and weights of the links 16 and 17, the connections 21 and 23, the levers 24, and the keys 26 are such that they are very nearly evenly balanced on the fulcrums 15 and 25. To overcome this and cause a quick action in the return of the type-dies from the printing position, a number of shafts 109 are run across the frame 1, and to these and to the key-levers springs 110 are connected.

An examination of the key-board will show that the keys are divided into two groups representing the upper and lower case letters mingled with certain characters and figures. Each of these keys is connected in the manner described with one of the type-carrying levers 18 and also by clips 101 with the spacing-levers 96. Intermediate the two groups of keys representing characters is a row of keys 111, marked on their faces "-1," "0," "1," "2," "3," "4," and "5." These are the spacing-keys, and the figures on their faces (which, to distinguish them from the character-keys, may be of a different color) represent the measure of space each of them is adapted to throw in between words. Thus the key marked "0" is designed to throw the normal space, which in the present instance is assumed to be two units, though obviously it may be any desired quantity. The key marked "-1" throws one unit less than the normal space, or one unit. The key marked "1" is designed to throw one unit more than the normal spacing movement—to wit, three units. The other keys respectively throw two, three, four, and five more units than the normal space, or totals of four, five, six, and seven units, respectively. These keys are used to throw any desired measure of space between words to produce justified lines of printing, and hence are connected to the spacing bails or levers 96 in the same manner as the other keys are connected to their levers, but are not connected to the type-carrying levers 18.

The impression-device member 9 has a stem 112, to which is attached a bevel-gear 113, into which meshes a pinion 114 on a shaft 115, that passes between the type-lever rods 21 to the exterior of the machine and is journaled at 116 in the frame 1 and carries a driving-wheel 117 on its outer end.

The cap 8 on the central raised body part 7 is bored out to receive several stop-pins 118, which are held from engagement with the impression device by catches 119. Surrounding and slightly removed from these catches is a ring 120, supported on three flexible spring-rods 121, fixed in the cap 8. This ring is so located that when one of the die-carrying levers 18 is thrown inward toward the printing-point it will strike and move the ring over in the direction of the die-lever movement and cause it to come in contact with one or more of the catches 119 and release them from the stop-pins 118. The released stop pin or pins will then descend by gravity (or by the force of springs) to engage the upper surface of the impression-device member 10, which is provided with inclines 122 and shoulders 123. Upon engagement of a shoulder 123 by a stop-pin rotation of the member 10 is interrupted and that member is caused by the member 9 to make an upward reciprocation, and this movement, while making a thrust of the plunger to impress a die, also lifts the stop-pins 118 to normal position. Upon the return vibration of the ring 120, after freeing a catch from a stop-pin, it rests against the lever 18 just far enough removed from the catches to permit the latter to re-engage the stop-pins that have been pushed upward by the thrust of the impression device.

The speed of the impression device and the movements of the parts 119 and 120 are so related to the movements of the carriers 18 that control of the impression device for plunger-thrusts is secured while the die is moving rapidly toward and is near to the printing position, and the result secured by this arrangement is that the impression device is engaged and caused to thrust the dies the instant they reach the printing position. By this means a speed is obtainable in excess of what would be possible in a machine in which the release of the impression device for making thrusts is effected after the die reaches its final position.

In Fig. 7 a modified construction is shown in which are omitted the brackets 12, the circular shaft 13, and the links 16, and in their stead there is used a cast-iron ring 124, having vertical slots, in which are inserted plates 125, having curved slots 126, that serve as guides for pins 127 in the lower ends of the levers 18. The plates 125 are held in place by two supplementary rings 128 and 129. It will be obvious that by changing the position of the connections between the links 17 and levers 18 relative to the pin in the slot 126 the shape of the slot may be varied and almost any desired movement of the die-lever may thus be obtained.

In Fig. 8 both links 16 and 17 are dispensed with and the desired movement of the die-lever is obtained by having two pins 130 and 131 engage in a slot 132 and by connecting the rod 21 directly to an arm 133 on the die-carrying lever, the desired direction of movement for the rod 21 being obtained by changing the key-levers from levers of the second class to levers of the first class.

In Fig. 9 the type-die sockets are carried on thin plates 134, that move in radial guides 135, milled in the bottom face of the plate 29 and the top face of a secondary plate 136. The lower edges of the plates 134 are provided with gear-teeth 137, that mesh into segmental gears 138, pivoted to posts 139 on a circular shelf 140. The segmental gears enter slots 141 in the plate 136 to engage the gears of the plates 134. The movement of the die-carrying plates 134 toward the center is arrested when the type-die is at the printing-point by contact with a ring 142. The impression device may be controlled by putting the stop-pins 118 at right angles to the impression device in the manner shown in my prior patents, Nos. 429,737, 429,739, and 429,742. The ring 120 is placed over the catches 119 in such position as to be struck by the segments 138 when the type-die is thrown to the printing-point, and the ring may be supported on push-springs 143. The patentable features relating to the forms of devices illustrated by this figure (Fig. 9) and the preceding Figs. 7 and 8 are reserved to be claimed in other applications hereafter to be filed by me, so as to pend concurrently herewith.

The type-carrying lever 18 is made of two parallel pieces, which receive the links 16 and 17 between them and at their upper ends receive a lug 144, formed on the type-socket body 145, as shown in Figs. 10, 11, and 12.

The head 146 of the type-die is first made round, of a diameter equal to that of the socket, and then has two sides milled off, as shown at 147, to a thickness equal to or slightly larger than the diameter of the die-stem 148. The socket is round, of a diameter equal to the original diameter of the die-head, and has the lug 144 on one side extending about one-half of the length of the socket-body. The socket has a slot 150 through its upper end of a width just sufficient to receive the flattened head of the die. The direction of this slot in the type-socket is always the same with respect to the machine; but the lug 144 on each socket varies with respect to the slot, so as to accommodate it to the varying positions of the type-carrying levers 18 in their circle. The bushing 28 has its aperture 27 of the same shape and size as the flattened head of the die and has a flaring opening 151 to receive and guide the die and socket-body when thrown into it, the die and socket having their ends beveled, as shown at 152, at the same inclination as the flare of the opening. The type-die is slightly loose in the socket, but fits accurately in the bushing 28. The object of this is that the die and its socket may be of comparatively cheap construction, and at the same time a means is provided for accurately guiding the die to the printing-point. A guide-pin and the devices necessary in connection therewith are thus dispensed with.

The type-die head 146 and its stem 148 are made in one piece, the latter having a tapering end 149, adapted to be engaged by a countersink 153 of similar form in the end of the plunger 11 of the impression device. The end portion of the die-stem is threaded to receive a nut 154 for holding a spring 155 on the stem, which serves to retract the die after it has been acted upon by the impression device. The removal of the nut from the stem permits the die to be readily removed from its socket.

The operation of the machine is as follows: The operator strikes one of the keys 26 to depress it, and with it depresses its lever 24, which by means of the connections and links throws the type-die inward in nearly horizontal direction until it is beneath the aperture 27, when the direction of movement changes to an upward thrust directly into the flaring mouth 151 of the opening. At about the moment of this change of direction of movement the lever 18 strikes the ring 120, which in turn strikes one of the catches 119, thus releasing the stop-pin 118, which descends and engages the upper part of the impression device and holds it, while the lower part continues to revolve in the direction of the arrow $a$. Thus the plunger 11 is thrust against the die-stem and the die is driven through the bushing into the matrix material M. The thrust of the impression device also pushes back to normal position the released stop-pin 118 to be re-engaged by its catch 119. The thrust is completed as soon as an incline on the lower part 9 has passed an incline on the upper part 10. While the movement of the key-lever 24 is moving the die toward the center the clip 101 on the lever engages the spacing-bail 96, that controls the proper feed movement for the character represented by the operated key, and by tilting it on its fulcrum 97 projects the upper end of one of the rods 102 into the path of the pawl-carrying slide 89. The tilting of one of these bails also tilts the bail 93 on the shaft 92, thus moving the lever 91 toward the front, carrying with it the pawl 90 and its frame 89 until stopped by the rod 102 that was elevated. This movement passes the pawl from the first ratchet-wheel $a$ to another of the series 85 and permits an escapement of one tooth each for as many ratchet-wheels as the pawl has passed before it was stopped by the projected rod 102 to engage a ratchet-wheel. The release of the key 26 permits the lever 24 to rise and carry the type-die back to its initial position and also permits the levers 93, 96, and 91 to return to normal position, and in returning to cause the pawl 90 to be retracted to the first ratchet-wheel $a$ of the series 85, and thus the matrix-carriage is permitted a movement equal to the space of as many teeth as the pawl permitted the ratchet-wheels to escape, the escapement of the carriage at the same time taking up the previous escapement of the ratchet-wheels. In the same way other impressions and other carriage movements are made until the matrix is moved to the end of a line, when the operator by pressing on the end of the hand-wheel 48 returns the carriage to the beginning of a line and winds the spring 80, which had become unwound by the forward movement of the carriage toward the left. Then by pushing on the key 43 he rotates the feed-wheels 37 to feed the matrix forward for the next line. In the same way any number of lines may be printed. When the operator wishes to examine the printing, he pushes on the button 66, which releases the catches 53 and 56, and the spring 50 raises the platen. Instead of giving the spring 50 a tension sufficient to raise the platen, it is obvious that it may be raised by hand and the spring have only sufficient force to relieve the weight. In the latter case an upward initial tension on the platen to prevent any possibility of lost motion when the dies are being impressed into the matrix may be given by one or more short-motion push-springs located in the top of the casing and acting to resist the downward motion of the platen just before it reaches a position to be locked by the catches 53 and 56.

I claim—

1. A series of type-die carriers, a rotary impression device having axial movement and capable of making such movement when the rotation of one of its members is stopped, a series of stopping devices for controlling the rotation of said member, and a rebounding knocker co-operating with said die-carriers and stopping devices.

2. A series of independently-movable die-carriers, a rotary impression device having two members, one of which is capable of making a single thrust when its rotation is stopped, stopping devices therefor, and means provided on the member engaged for returning the stops to original position, and a device actuated by the die-carriers to cause the movement of the stops to engaging position, substantially as set forth.

3. A continuously-rotating and intermittently-reciprocating impression device, stops for controlling the reciprocations, catches for restraining the stops, a releasing device for the latter, and a series of independently-movable die-carriers for operating the releasing device.

4. A type-die body and a holding-socket therefor, the two forming a uniform cylinder having a tapering end, in combination with a device providing a guiding-aperture having a flaring opening corresponding with the taper on said type-die and its socket.

5. A cylindrical type-die body having two opposite sides flattened, in combination with a cylindrical socket of the same diameter as the type-die body and having a transverse slot adapted to receive and guide said type-die body.

6. A type-die body in form of a cylinder with flattened sides, in combination with a plate providing an aperture shaped to correspond with said type-die body and adapted to guide and center the die.

7. A type-die having both ends tapering, one of said ends being also flattened on two opposite sides, for the purpose set forth.

8. A series of die-carriers adapted to be separately moved to proximity to a common printing-point, an impression device opposite the printing-point, and releasing devices therefor arranged to be engaged by the moving die-carriers to cause the operation of the impression device.

9. A series of die-carriers adapted to be separately moved to a common point, a rotating and intermittingly-reciprocating impression device opposite such point, and releasing devices therefor to permit plunger-thrusts, such devices being arranged in the path of the carriers, whereby the movements of the latter cause the release of the impression device.

10. A series of die-carriers independently movable to a common point, an impression device opposite such point, releasing devices for permitting its operation, and means whereby the carriers in moving to such common point will operate said releasing devices to cause the impression device to thrust.

11. In a matrix-machine, an impression device having a continuously-rotating member and a coacting member adapted to be intermittingly reciprocated, controlling devices for engaging the latter member to cause it to be reciprocated, and a series of independent die-carriers arranged to present dies to the impression device and to cause its operation by engaging said controlling devices in moving the dies to position.

12. A rotating impression device having two members, one of which reciprocates when its rotation is stopped, stopping devices therefor, a spring-supported device capable of oscillation for controlling said stopping devices, and a series of independently-movable die-carriers arranged to move said oscillating device in presenting dies at the printing-point.

13. The combination, with an impression device having a constantly-rotating and a rotating and intermittingly-reciprocating member, of stops for engaging the latter member to cause it to reciprocate, a movable device encircling the stops for operating them, and a series of die-carriers arranged to actuate such movable device in presenting dies to the impression device.

14. A rotary impression device having one member adapted to reciprocate when its rotation is intercepted, sliding stops for its interception, spring-catches therefor, a ring encircling the stops, and die-carriers arranged to move the ring to disengage said catches while presenting their dies at the printing-point.

15. A rotary impression device having one member adapted to reciprocate when its rotation is stopped, stopping devices therefor arranged to slide in the direction of the member's reciprocations, cam-surfaces with shoulders on such member for engaging the stops, catches for holding the stops away from the member, a device for releasing the catches, and die-carriers arranged to operate the catch-releasing device while moving their dies to the printing-point.

16. An independently-operating impression device adapted to make a single thrust upon being released, a series of die-carriers surrounding it and a common printing-point, means for moving them separately to such point, and devices engaged thereby and acting upon the impression device to release it to cause a single plunger thrust for each die presented.

17. A continuously-rotating and intermittingly-reciprocating impression device, a series of type-die carriers arranged about said impression device, and controlling devices provided between the impression device and carriers, whereby the latter in being moved toward a common center will engage such controlling devices to cause the impression device to reciprocate.

18. A type-die, a socket and carrier therefor, and a guiding device at the printing-point, adapted to restrain the socket, while permitting the die to enter.

19. A fixed guiding device at the printing-point, a carrier having a die-socket and a sliding die therein and adapted to thrust the socket into the guiding device, and an impression device adapted to drive the die through its socket and guide its outer end while driving it.

20. A fixed device providing a guiding-aperture at the printing-point, a movable type-socket adapted to be thrown into and fit said aperture, and a sliding type-die carried in said socket and adapted to be thrust through and guided by said aperture.

21. A type-die body having its sides partly flat and partly curved and a cylindrical socket therefor having a slot adapted to receive and guide such body, in combination with a guiding device providing an aperture corresponding to the shape of the die-body and having a flaring mouth shaped to center and detain the socket.

22. A rigid plate providing a guiding-aperture, a type-socket adapted to be thrust into the mouth of said aperture, a sliding type-die loosely carried in the socket and having sides fitting accurately the sides of the guiding-aperture, and an impression device adapted to thrust the die to cause it to slide into and through the guiding-aperture and to center and guide the outer end of the die-stem while thrusting it.

23. A hinged printing-platen, means for locking it in fixed position, and a movable matrix-carriage held to and guided by the platen.

24. A hinged printing-platen, a casing supporting it and serving also to support a series of independent type-levers and an impression device, and means for locking the platen rigidly to the casing.

25. A hinged printing-platen, a matrix-carriage movable thereon and carrying a matrix-body, type-dies and means for successively presenting and impressing them to a uniform depth in the matrix-body, and means for accurately guiding the dies while they are being impressed.

26. A series of type-dies, each adapted to carry a supporting-spring between the die-head and the end of the die-stem and each adapted to slide in its respective carrier when thrust upon, a device providing a guiding-aperture for the dies at the printing-point, a series of hand-keys and connections for moving the dies independently to contact with the guiding device, and an impression device adapted to thrust the dies through the guiding device and to guide the end of the die-stem while making such thrust.

27. A hinged printing-platen presenting an extended face, a matrix-carriage adapted to move across the face of the printing-platen, a variable-feed device, and a detachable connection between the feed device and the matrix-carriage.

28. In combination, a platen, a matrix-carriage sliding thereon, and a rack connected to the carriage by a sliding joint, substantially as set forth.

29. In combination, a hinged platen, a matrix-carriage sliding thereon and connected thereto, a rack, and a connection between the carriage and rack, adapted to be freed by turning the platen on its hinge.

30. The combination, with key-levers and spacing-levers, of clips attached to the former and having forks for engaging the latter levers to move them.

31. In a matrix-machine, a cap-plate providing a guiding-aperture at the printing-point, an impression device beneath the aperture, and separately-movable type-carriers pivoted and guided to move substantially parallel to said plate to the center and to move their type upward into the aperture without impressing them.

32. In a matrix-machine, the combination, with an impression device and a guiding device at the printing-point, of a type-lever pivoted to the adjacent free ends of opposite links, arranged to move the type laterally to and axially into the guiding device.

33. In a matrix-machine, a circular case, an interior central support for an impression device and a reciprocating impression device guided therein, a die-guiding device at the printing-point, and a series of type-die carriers pivoted at different points to the adjacent ends of opposite links, the fulcrums of which are mounted, respectively, on the case and said central support, the links being arranged to move the dies to the center and enter them in the guiding device without impressing them.

34. In a matrix-machine, a die-centering device at the printing-point, an impression device opposite thereto, and a series of die-carrying levers pivoted to operating and guiding devices adapted to move the dies first laterally toward the printing-point and next axially into the centering device without thrusting them through the same.

35. A rotary impression device capable of axial movement of uniform extent when one of its members is stopped, stopping devices therefor movable parallel to the axis of the impression device, means for moving them to engagement, a cam-surface on the impression device for returning them, catches for holding them when returned, a rebounding device for releasing the catches, and die-carriers arranged to actuate such rebounding device while moving their dies to the printing-point, substantially as set forth.

36. In combination, separately-movable carriers, die-sockets thereon, sliding type-dies in the sockets, an unyielding device providing a flaring aperture at the printing-point, adapted to center said sockets and terminating in an aperture having walls adapted to guide the die, an impression device operating opposite the aperture, and means for moving the carriers to enter the sockets in the flare of said aperture.

37. A series of die-carriers and type-dies arranged to slide therein and means for moving them separately to present their dies in line with the printing-point and moving them axially toward such point, in combination with an unyielding guiding device for centering the dies at the printing-point and an impression device adapted to serve also as a centering device for the die-stem.

38. In a matrix-machine, a casing adapted to support in its interior a series of separately-movable type-levers and an impression device and having a series of slotted openings in its lower head and a single guiding-aperture in its upper head at the printing-point.

39. In combination, a rack, a motor-spring and gear for giving motion to the rack, a second gear and holding device for resisting such motion, means for releasing the holding device to permit variable movements of the rack, a matrix-carriage, and a separable connection between the rack and the carriage.

40. A guiding device for type-dies at the printing-point, an impression device opposite such guiding device, adapted to be set in operation by the movement of the type-carriers toward it from any direction, a series of independently-movable carriers and type-dies surrounding the impression device, and a corresponding series of hand-keys for moving the carriers toward the impression device and the type-dies to the printing-point.

41. A plate providing a guiding-aperture for type-dies at the printing-point, a hinged printing-platen adapted to be securely locked in position slightly removed from said plate, and a matrix-carriage arranged to reciprocate in the space between said plate and platen.

42. A casing adapted to support a series of type-dies, a central frame adapted to serve as a socket and support for an impression device, an impression device therein, a device for controlling it, and a cap surmounting said frame and supporting the latter device.

43. A casing having a series of independently-movable type-dies and furnishing a support for an impression device at the center, an impression device held thereby, a device mounted on such support for controlling the impression device, and means for adjusting the height of the impression device.

44. In a matrix-machine, a key-board having a series of upper-case characters arranged in an inner group, a series of lower-case characters arranged in an outer group, and a series of spacing-keys in a rack between such groups and serving to divide them from each other and adapted to throw each a different degree of space between words.

45. Die-carriers on movable pivots, type-dies held thereby a series of hand-keys for moving the dies independently to a common printing-point, a guiding device for the dies at such point, and an impression device adapted to thrust the dies through the guiding device and to guide the die-stem while making such thrust.

46. A type-carrier connected to moving pivots and means for throwing it to present its type opposite a printing-point, in combination with a guiding device at such point and an independent impression device for thrusting the die when so presented.

47. The combination, with an impression device and a guiding device at the printing-point, of a type-lever connected to movable pivots, and means for moving the pivots and lever to present the die at the printing-point.

48. A series of type-dies and carriers therefor having compound movements on moving pivots, the first movements being lateral to bring the die opposite the printing-point and the second in line with such point to bring the die in printing position without impressing it, in combination with an unyielding guiding device at the printing-point and an automatic impression device for thrusting the presented dies.

49. A series of independently-movable type-carriers and a restrained impressing device arranged to be set free for operation by the force of any of the carriers in moving their type to the printing-point.

50. The combination, with circularly-arranged die-carriers having movements radially toward and axially into printing position, of an impression device opposite the printing-point, adapted to thrust upon being released and having a releasing device in the path of movement of the die-carriers, for the purpose set forth.

51. The combination, with an automatic impression device and separately-movable die-carriers, of a rebounding device arranged to be actuated by each of the die-carriers for controlling the impression device.

52. An impression device arranged to make a single thrust when released and a device for controlling its release, in combination with independent type-carriers, each of which is arranged to engage said releasing device in moving its die to printing position and thereby cause a thrust of the impression device.

53. A series of independently-movable die-carriers, a rotating and intermittingly-reciprocating impression device, and devices for engaging it to control its reciprocations, such controlling devices being placed in the paths of the die-carriers, whereby the latter in presenting their dies to the printing-point cause the release of the impression device to permit it to begin its thrusting movement while the dies are moving to printing position.

54. The combination, with an intermittingly-reciprocating impression device, of a series of independently-movable type-carriers whose movements are first radially inward and next axially to the printing-point, and devices for controlling the reciprocation of the impression device, arranged to be actuated by the die-carriers while making their radial movements to cause a thrust immediately upon completion of such movement.

55. A guiding device at the printing-point, an impression device opposite thereto and consisting of a continuously-rotating member and a connected member adapted to reciprocate when its rotation is stopped, a plunger carried by the latter member and adapted to center the stem of a type-die, a series of independent carriers carrying sliding type-dies, and devices arranged to be engaged by the carriers as they move toward the printing-point for stopping such reciprocating member to cause it to make a single plunger-thrust immediately upon the arrival of the die at printing position.

56. In a matrix-machine, a casing adapted to support in its interior a series of separately-movable type-levers and an automatic impression device and having a series of slotted openings in its lower head and a single guiding-aperture for the dies in its upper head at the printing-point.

CASPER L. REDFIELD.

Witnesses:
THOS. C. MOORE,
E. W. NEFF.